(12) United States Patent
McDaniel

(10) Patent No.: US 10,119,443 B2
(45) Date of Patent: Nov. 6, 2018

(54) SPARK ARRESTOR AND METHODS ASSOCIATED THEREWITH

(71) Applicant: Stephen McDaniel, Winston Salem, NC (US)

(72) Inventor: Stephen McDaniel, Winston Salem, NC (US)

( * ) Notice: Subject to any disclaimer, the term of this patent is extended or adjusted under 35 U.S.C. 154(b) by 558 days.

(21) Appl. No.: 14/558,469

(22) Filed: Dec. 2, 2014

(65) Prior Publication Data

US 2016/0023027 A1    Jan. 28, 2016

Related U.S. Application Data

(60) Provisional application No. 62/028,898, filed on Jul. 25, 2014.

(51) Int. Cl.
| | |
|---|---|
| *F01N 3/06* | (2006.01) |
| *B01D 46/00* | (2006.01) |
| *F23J 15/02* | (2006.01) |
| *A62C 4/04* | (2006.01) |

(52) U.S. Cl.
CPC .................. *F01N 3/06* (2013.01); *A62C 4/04* (2013.01); *B01D 46/0093* (2013.01); *F23J 15/022* (2013.01); *F01N 2230/06* (2013.01)

(58) Field of Classification Search
CPC ........ F01N 3/06; F01N 2230/06; Y10S 55/20; B01D 46/0093
See application file for complete search history.

(56) References Cited

U.S. PATENT DOCUMENTS

| 223,403 | A | * | 1/1880 | Stewart | B01D 45/12 |
| | | | | | 220/88.1 |
| 2,075,264 | A | * | 3/1937 | Maxim | F01N 1/02 |
| | | | | | 181/231 |
| 2,822,886 | A | * | 2/1958 | Schweitzer | F01N 3/06 |
| | | | | | 55/434.2 |
| 4,394,143 | A | * | 7/1983 | O'Dell | A62C 3/04 |
| | | | | | 110/119 |

FOREIGN PATENT DOCUMENTS

GB              976343 A  *  11/1964  ............... F01N 3/06

* cited by examiner

*Primary Examiner* — David J Laux
(74) *Attorney, Agent, or Firm* — Ben Schroeder Law PLLC

(57) ABSTRACT

The present invention relates to spark traps/arrestors that are improved relative to those that currently exist. For example, the present invention relates to a spark arrestor/trap that comprises a plurality of features that allows sparks/embers to be more effectively extinguished. The spark trap/arrestor of the present invention has at least two of vanes, conical devices and u-turns that allows for sufficient oxygen and a tortured path that is sufficiently long so as to effectively extinguish sparks and/or embers that enter the system. Alternatively, the system relates to a spark arrestor that comprises all of vanes, conical devices and u-turns that allows for sufficient oxygen and a tortured path that is sufficiently long so as to effectively extinguish sparks and/or embers that enter the system. In one embodiment, the various parts of the spark arrestor can be separated allowing for easy cleaning of the system.

20 Claims, 4 Drawing Sheets

SPARK ARRESTOR AND METHODS ASSOCIATED THEREWITH

The present invention claims priority under 35 USC 119(e) to U.S. Provisional Application No. 62/028,898 filed Jul. 25, 2014, the entire contents of which is incorporated by reference in its entirety.

FIELD OF THE INVENTION

The present invention relates to spark traps/arrestors that are improved relative to those that currently exist.

BACKGROUND OF THE INVENTION

Spark arrestors have been used in a plurality of technologies including steam engines, internal combustion engines, building flues or chimneys, in various types of electrical equipment, and on automotive/motor vehicle exhaust equipment. They also find use in welding technologies.

A spark arrestor is any device which prevents the emission of flammable debris from reaching combustion sources. Spark arrestors are used for a plurality of reasons, for example, they may play a critical role in the prevention of dust collection, the prevention of wildland fires and the prevention of the ignition of explosive atmospheres. These safety features in some instance mean that their use is required by law in many jurisdictions worldwide.

Spark Traps/Arrestors in general are designed to swirl and confuse the air inside, for example, duct work and/or a chamber in order that the spark has time to extinguish. It is called the introduction of a 'tortured path'. In some situations, the swirling air via the wind that blows adds oxygen to the ember, which serves to more rapidly extinguish the spark. This is similar to blowing on a coal, which increases the burning thereby shortening the life of the ember.

The currently existing spark traps offer several methods of being able to work. Some have a series of vanes that swirl the air inside the enlarged chamber. Others may possess a cone in the duct to divert air. Others have proposed an arrangement where the outlet pipe is extended into the duct so that the air and material do a series of u-turns before the air exits the chamber. All of these in some form or other create a tortured path. However, these devices sometimes fail to adequately serve as a spark arrestor. In situations where a spark/ember is large, it may be desired to have a device that keeps the spark/ember in the spark trap/arrestor for longer periods of time. For example, with the system that uses vanes, the systems that are currently on the market are not as effective an larger/higher mass particles that burn longer because the air is exhausted directly out the other side, often allowing the spark to pass from one side of the arrestor to the other. Systems that use a cone tend to constrict the air too much because these systems generally have a smaller inlet duct, which allows the spark/ember to stay alight too long due to inadequate ventilation/oxygen in the system. Systems, which contain vanes tend to also release the exhaust too rapidly. Moreover, most of the currently existing systems do not allow for easy cleaning of the system, which means that combustible materials may build up in the system. If an ember or spark ignites the combustible material one may got an explosion (for example, an exhaust system backfire). The present invention addresses these drawbacks.

BRIEF SUMMARY OF THE INVENTION

The present invention relates to a spark arrestor/trap that comprises a plurality of features that allows sparks/embers to be more effectively extinguished. In an embodiment, the spark trap/arrestor of the present invention has at least two of the following: a) vanes, b) conical devices and c) u-turns that allows for sufficient oxygen and a tortured path that is sufficiently long so as to effectively extinguish sparks and/or embers that enter the system. In an embodiment, the present invention relates to a system that comprises all three of a) vanes, b) conical devices and c) u-turns that allows for sufficient oxygen and a tortured path that is sufficiently long so as to effectively extinguish sparks and/or embers that enter the system. In an embodiment, the various parts of the spark arrestor can be separated allowing for easy cleaning of the system.

DETAILED DESCRIPTION

The present invention relates to a spark arrestor/trap that comprises a plurality of features that allows sparks/embers to be more effectively extinguished. In an embodiment, the spark trap/arrestor of the present invention has at least two of vanes, conical devices and u-turns that allows for sufficient oxygen and a tortured path that is sufficiently long so as to effectively extinguish sparks and/or embers that enter the system. In an embodiment, the present invention relates to a system that comprises all of vanes, conical devices and u-turns that allows for sufficient oxygen and a tortured path that is sufficiently long so as to effectively extinguish sparks and/or embers that enter the system. In an embodiment, the various parts of the spark arrestor can be separated allowing for easy cleaning of the system.

In an embodiment, the present invention will be explained with reference to FIG. 1. However, it is contemplated and therefore within the scope of the invention that minor modifications can be made to the system without departing from the spirit and scope of the invention.

Figure 1:
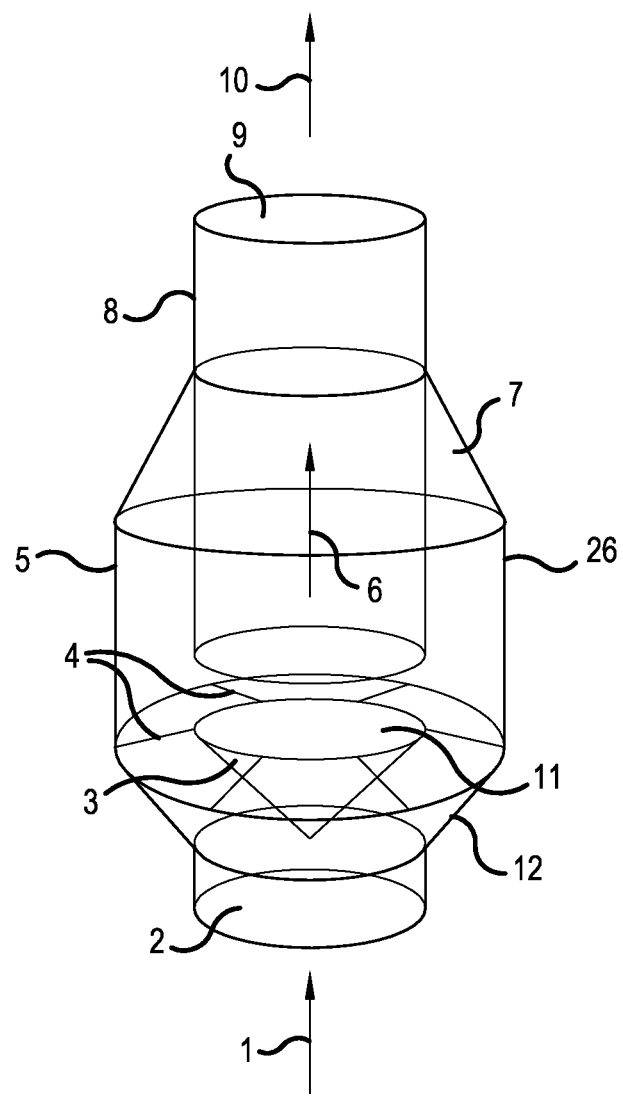
FIG. 1 shows a perspective view of an embodiment of a spark arrestor.

FIG. 1 shows an embodiment of the spark arrestor of the present invention. In FIG. 1, inlet flow direction 1, outlet flow direction 10 and inner cylinder flow direction 6 ail show the direction of air flow containing the sparks and/or embers into, through, and out of the system. The air containing the sparks and/or embers passes in inlet flow direction 1 and enters the system at inlet part 2, wherein it encounters conical device 3. Inlet port 2 is of a sufficiently large diameter so that a sufficient amount of oxygen can pass into the system via inlet flow direction 1. The amount of oxygen is sufficient so as to allow rapid burning of the embers and/or sparks. When the air has entered the system via inlet port 2, it encounters conical device 3, which forces the air to the outer diameters of large cylinder 5, wherein the air encounters vanes 4. In an embodiment, the vanes 4 are attached to the conical device 3. The vanes 4 cause turbulence in the passing air thereby impeding the passage of air (the sparks and/or embers). The vanes 4 are also designed so that air that passes vanes 4 are directed to go outside of inner cylinder 8. The positioning of the conical device 3 and the vanes 4 cause much of the air to pass into u-turn position 7 wherein the air, sparks, and/or embers u-turn in a direction towards vanes 4. The air, sparks, and/or embers encounter newly incoming air that has entered via inlet port 2 and through vanes 4 causing most of the u-turned air, sparks and/or embers to enter into inner cylinder 8 in the inner cylinder flow direction 6. The air that contained the sparks, and/or embers pass through outlet port 9 in outlet flow direction 10. By the time the air, sparks, and/or embers reach outlet port 9, the sparks and/or embers have been effectively extinguished. Generally, it is the swirling in the outer chamber that extinguishes the sparks and/or embers. Generally, the sparks and/or embers do not even reach the inner cylinder as they are extinguished by the time they enter the inner cylinder 8.

Figure 2:
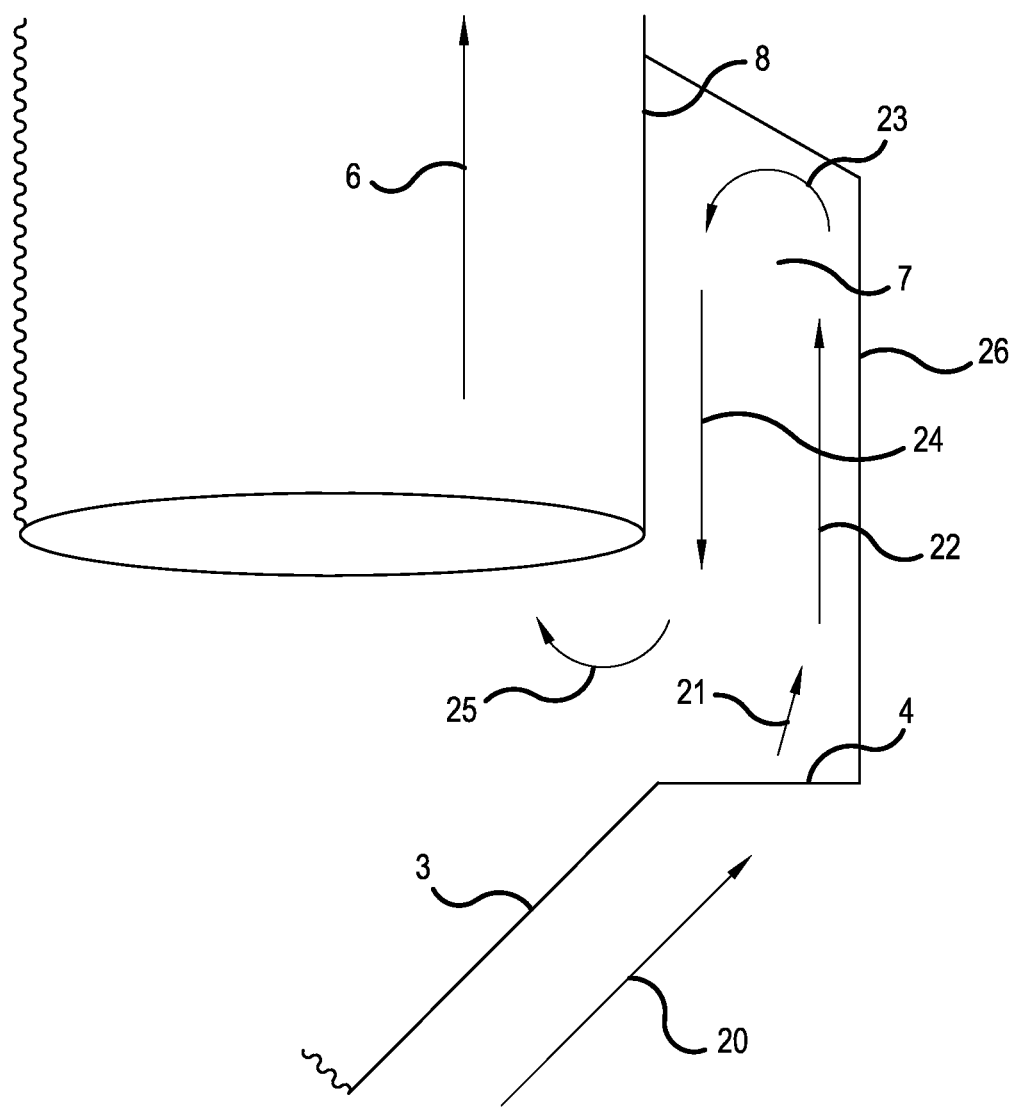
FIG. 2 shows a front view of one embodiment of the air flow in the spark arrestor/trap.

The direction of the air flow after encountering vane 4 is better shown in FIG. 2. In FIG. 2, the incoming air, sparks, and/or embers encounter conical device 3, which causes the air, sparks, and/or embers to pass along a path that includes air paths 20, 21, 22, 23, 24, and 25. When air path 20 encounters vanes 4, vanes 4 push the air via air path 21 to the very outer diameter of outer cylinder 26. The air continues along the outer diameter of outer cylinder 26 along air path 22 until it reaches a point where the air is forced to u-turn at u-turn position 7 via air path 23. At this point the air passes along just outside the diameter of inner cylinder 8 along air path 24. Air path 21 partially encounters air path 24 causing the air to u-turn into the inner diameter of inner cylinder 8 via air path 25.

It should be noted that although FIG. 2 is shown as a front view drawing, the bottom of the cylinder is shown in perspective view to aid the readers' understanding of the invention. One should be aware that it is contemplated that a plurality of vanes are present so that the air flow is similar to that shown in FIG. 2 throughout the entire outer cylinder 26. In one embodiment, there are between about 4 and 32 vanes. It should be noted that the number of vanes can be increased or decreased depending on the amount of oxygen (e.g., the vanes can be designed so as to increase the time spent in the spark arrestor) one wants in the system and the amount of turbulence one wants to generate for the flow of air, embers and/or sparks.

In one embodiment, the diameter of inner cylinder 8 is equal to the diameter of the base portion 11 of conical device 3. In an embodiment, the diameter of the base portion of conical device 3 may be greater than the diameter of inner cylinder 8. Generally, one does not want the diameter of the base portion of conical device 3 to be less than that of inner cylinder 8 unless vanes 4 are specifically designed to pass the embers, sparks, and/or air in a direction that is on the very outer diameter (but still inside) outer cylinder 26. The end of inner cylinder 8 that is closer to the base portion of conical device 3 should be positioned so that the air, sparks, and/or embers undergo thou-turn that is shown, for example, in FIG. 2. For example, if the end of inner cylinder 8 that is closer to the base portion of conical device 3 is positioned so that it is at least partially within outer cylinder 26, the u-turning of air, embers, and/or sparks will occur.

In an embodiment, the vanes may be oriented in such a way as to create a cyclone type of air flow in outer cylinder 26. The vanes 4 may be constructed similar to vents on a turbine or alternatively, to automotive heating and air conditioning so as to create the cyclone effect.

Figure 3:
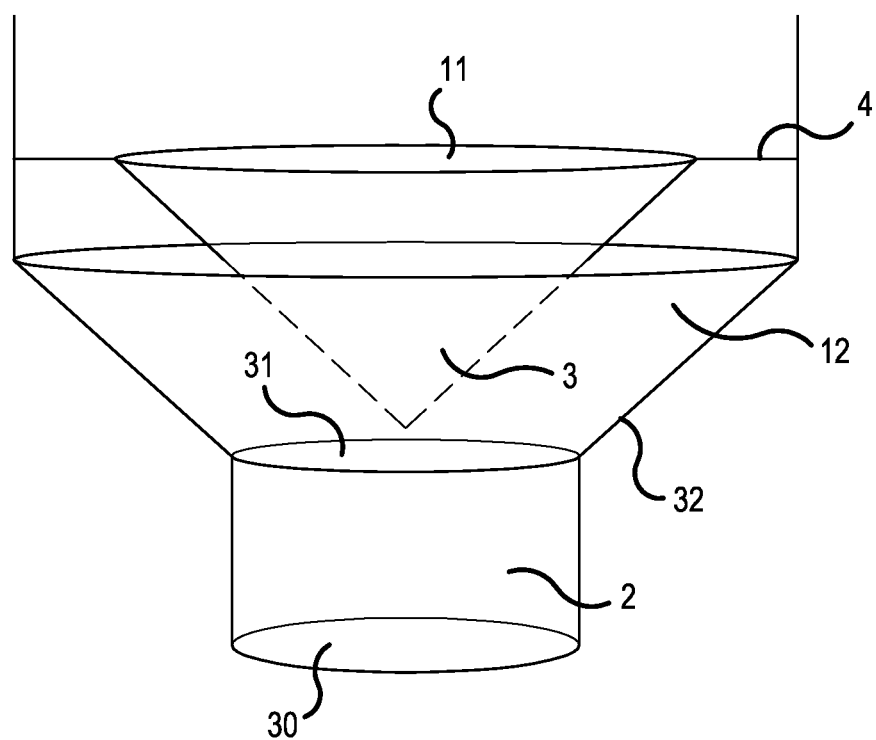
FIG. 3 shows a close up perspective view of one embodiment of the inlet port and the tapered region of the spark arrestor/trap.

In one embodiment, the diameter of inlet port 2 should be less than the diameter of the base portion 11 of conical device 3 (not shown in FIG. 1 but shown in FIG. 3). It has been found that one gets very good extinguishment of embers and/or sparks when the diameter of the base portion 11 of conical device 3 is between about 1.2 to 1.5 times the diameter of inlet port 2. It has been found that when the diameter of the base portion 11 of conical device 3 is about 1.2 to 1.5 times the diameter of inlet port 2 there is adequate air so that one does not get pressure build-up in the spark arrestor.

In an embodiment, the diameter of the inlet port 2 is about equal to the diameter of the inner cylinder 8. Accordingly, in one embodiment, the diameter of the base portion 11 of conical device 3 is about 1.2 times the diameter of the inner cylinder 8 (not shown in the figures).

In an embodiment, it has been found that the air, embers and/or sparks that are passing in inlet flow direction 1, and after they have passed inlet port 2, some tapering at tapered region 12 of the device aids in having a constant air flow as it approaches the plurality of vanes 4. The tapered region 12 may be completely parallel to the curved surface of conical device 3. In a variation, the air that passes in the region between the tapering 12 and the curved surface of conical device 3 may become more constricted as the air, sparks, and/or embers approaches the plurality of vanes 4. In one embodiment, the volume present at inlet port 2 should roughly equal the volume that is present in the tapered region 12. This can best be seen in FIG. 3 wherein the volume that is present in the cylindrical inlet port 2 (between bottom of inlet port 30 and top of inlet port 31) is roughly equal to the volume that is present in tapered region 12 (i.e., the region that is defined by top of inlet port 31, the curved surface of conical device 3, the plurality of vanes 4 and the outer part of the tapered region 32. In one embodiment, and as shown in FIG. 3, the tapered region 12 may also be bounded by the lower part of outer cylinder 26. In a variation, the conical device 3 may be positioned lower so that the vanes 4 are perpendicular with the very bottom of outer cylinder 26 (in this variation, there is no portion of the outer cylinder that contributes to the volume of the tapered region).

In an embodiment, the volume that is defined by the region encompassed by the inside of the outer cylinder 26, the outside of the inner cylinder 8, the u-turn position 7, and the vanes 4 and base portion 11 of the conical device is roughly equal to the volume of the inlet port 2, which in turn is roughly equal to the volume of the tapered region. In some embodiments, the base portion 11 of the conical device 3 may not, be completely flat but may have indentations or protrusions that slow air flow through the spark arrestor. In some embodiments, the base portion 11 of the conical device 3 may have indentations or protrusions that create more turbulence in the spark arrestor, thereby accelerating the extinguishment of the sparks/embers.

Figure 4:
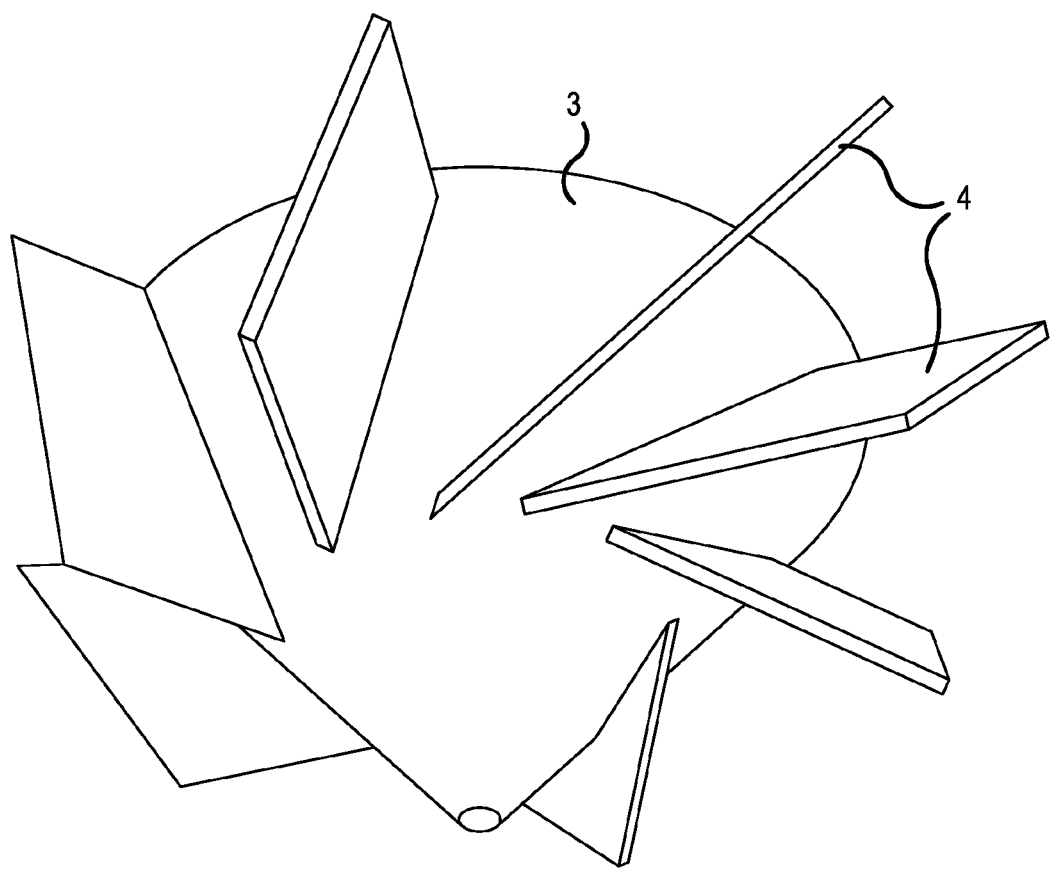
FIG. 4 show a perspective view of one embodiment of the conical device and the one or more vanes associated therewith.

In an embodiment, the conical device 3 with a plurality of vanes 4 is shown in FIG. 4, it should be noted how the one or more vanes 4 are positioned so as to create turbulence in the air and may be angled so as to three the air, sparks and/or embers to follow a tortured path and follow a path that takes the air, sparks and/or embers into the it-turn region 7 as shown in FIG. 2.

In an embodiment, the inner cylinder 8 is positioned so that the air flow occurs as is shown in FIG. 2. This may require that the position of the cylinder be adjusted slightly.

In an embodiment, the spark arrestor/trap can be disassembled for easy cleaning. In one embodiment, there are clamp joints that can be removed that allow easy cleaning of the inside of the various parts of the spark trap/arrestor. The clamp joints or other means of holding the various parts of the spark arrestor together should be designed so as to allow easy reassembling. In an embodiment, the spark arrestor may have one or more doors associated with it that allows one to clean the inside of one or more parts of the spark arrestor so as to preclude the build-up of combustible materials. These doors may be made of sheet metal or another material that is suitable in spark traps/arrestors.

Thus, in an embodiment, the present invention relates to a spark arrestor that comprises at least two of a) a conical device, b) one or more vanes, and c) at least one region wherein air that enters the spark arrestor is forced to u-turn. In a variation, the spark arrestor has all three of a) the conical device, b) one or more vanes, and c) at least one region wherein air is forced to u-turn. In one embodiment, the present invention relates to a spark arrestor, wherein the conical device has a vertex, a base, and a curved surface, wherein the vertex is positioned in a direction so that the vertex encounters air entering through an inlet port prior to the curved surface, and the curved surface encounters the air entering through the inlet port prior to the base, wherein the one or more vanes are positioned at one or more points where the base makes contact with the curved surface, the one or more vanes designed to direct air passing through the one or more vanes to the at least one region wherein air is forced to u-turn.

In a variation, the spark arrestor further comprises an inlet port. In one embodiment, the volume of the inlet port is roughly equal in volume to the at least one region wherein air is forced to u-turn.

In one variation of the spark arrestor, the one or more vanes are positioned so as to create a cyclone in the spark arrestor.

In one embodiment, the spark arrestor further comprises an inner cylinder that is deposed in a position so as to create the at least one region wherein air is forced to u-turn.

In a variation, the spark arrestor further comprises an inlet port.

In one embodiment, the volume of the inlet port is roughly equal in volume to the at least one region wherein air is forced to u-turn. In one variation of this embodiment, the one or more vanes are designed and/or positioned so as to create a cyclone in the spark arrestor.

In one embodiment, the spark arrestor may further comprise an inlet port. In one variation, the volume of the inlet port is roughly equal in volume to the at least one region wherein air is forced to u-turn.

In one embodiment, the present invention relates to a spark arrestor that comprises a) a conical device, b) one or more vanes, c) at least one region wherein air that enters the spark arrestor is forced to u-turn, and d) an inner cylinder, wherein the conical device has a vertex, a base, and a curved surface, wherein the vertex is positioned in a direction so that the vertex encounters air entering through an inlet port prior to the curved surface, and the curved surface encounters the air entering through the inlet port prior to the base, wherein the one or more vanes are positioned at one or more points where the base makes contact with the curved surface, the one or more vanes designed to direct air passing through the one or more vanes to the at least one region wherein air is forced to u-turn, the one or more vanes are positioned so as to create a cyclone in the spark arrestor, wherein the inner cylinder is deposed in a position so as to create the at least one region wherein air is forced to u-turn, wherein a diameter of the inner cylinder is less than a diameter of the base of the conical device.

In one embodiment, the present invention relates to a spark device that can be used to extinguish embers and/or sparks by creating a tortured path. In a variation, the method of extinguishing embers and/or sparks is performed by passing the embers and/or sparks through a spark arrestor, the spark arrestor comprising at least two of a) a conical device, b) one or more vanes, and c) at least one region wherein air that enters the spark arrestor is forced to u-turn. In a variation, the spark arrestor has all three of a) the conical device, b) one or more vanes, and c) at least one region wherein air is forced to u-turn.

In an embodiment of the method, the conical device has a vertex, a base, and a curved surface, wherein the vertex is positioned in a direction so that the vertex encounters air entering through an inlet port prior to the curved surface, and the curved surface encounters the air entering through the inlet port prior to the base, wherein the one or more vanes are positioned at one or more points where the base makes contact with the curved surface, the one or more vanes designed to direct air passing through the one or more vanes to the at least one region wherein air is forced to u-turn. In a variation, the method uses a spark arrestor that further comprises an inner cylinder that is deposed in a position so as to create the at least one region wherein air is forced to u-turn. In a variation, the method uses a spark arrestor wherein the diameter of the inner cylinder is less than the diameter of the base of the conical device. In one variation, the diameter of the base of the conical device is about 1.2 times larger than the diameter of the inner cylinder.

It should be understood that the present invention contemplates (and it therefore is within the scope of the invention) that any feature of the spark arrestor can be combined with any other feature of the spark arrestor, even if those features are not discussed together. Minor modifications can be made to the features of the present invention without departing from the spirit of the scope of the invention. Finally, the present invention is to be defined by the below claims.

I claim:

1. A spark arrestor that comprises a) a conical device, b) one or more vanes, and c) at least one region wherein air is forced to u-turn, and d) an inner cylinder having a length and a diameter, wherein said conical device has a vertex, a curved surface, and a base, wherein a diameter of said base of the conical device is about 1.2 times the diameter of inner cylinder, said one or more vanes positioned on the curved surface of the conical device and so designed so that air that passes the one or more vanes is directed to go outside of the inner cylinder and when all of said air that is forced to u-turn encounters air that has just encountered said one or more vanes, all of said air that is forced to u-turn immediately u-turns again to pass into an inner diameter of said inner cylinder.

2. The spark arrestor of claim 1, further comprising an inlet port.

3. The spark arrestor of claim 2, wherein a volume of the inlet port is roughly equal in volume to the at least one region wherein air is forced to u-turn.

4. The spark arrestor of claim 3, wherein the one or more vanes are positioned so as to create a cyclone in the spark arrestor.

5. The spark arrestor of claim 1, wherein said inner cylinder is deposed in a position so as to create the at least one region wherein air is forced to u-turn.

6. The spark arrestor of claim 5, further comprising an inlet port.

7. The spark arrestor of claim 6, wherein a volume of the inlet port is roughly equal in volume to the at least one region wherein air is forced to u-turn.

8. The spark arrestor of claim 7, wherein the one or more vanes are designed so as to create a cyclone in the spark arrestor.

9. The spark arrestor of claim 1, wherein the vertex is positioned in a direction so that the vertex encounters air entering through an inlet port prior to the curved surface, and the curved surface encounters the air entering through the inlet port prior to the base, wherein the one or more vanes are positioned at one or more points where the base makes contact with the curved surface, the one or more vanes designed to direct air passing through the one or more vanes to the at least one region wherein air is forced to u-turn.

10. The spark arrestor of claim 9, wherein the one or more vanes are positioned so as to create a cyclone in the spark arrestor.

11. The spark arrestor of claim 10, further comprising an inlet port.

12. The spark arrestor of claim 11, wherein a volume of the inlet port is roughly equal in volume to the at least one region wherein air is forced to u-turn.

13. The spark arrestor of claim 1, wherein the spark arrestor further comprises one or more doors and/or one or more clamp joints.

14. The spark arrestor of claim 1, wherein the base of the conical device comprises indentations or protrusions.

15. A spark arrestor that comprises a) a conical device, b) one or more vanes, c) at least one region wherein air that enters the spark arrestor is forced to u-turn, and d) an inner cylinder,
wherein the conical device has a vertex, a base, and a curved surface, wherein the vertex is positioned in a direction so that the vertex encounters air entering through an inlet port prior to the curved surface, and the curved surface encounters the air entering through the inlet port prior to the base, wherein the one or more vanes are positioned on the curved surface of the conical device, the one or more vanes designed to direct air passing through the one or more vanes to the at least one region wherein air is forced to u-turn, the one or more vanes are positioned so as to create a cyclone in the spark arrestor, wherein the inner cylinder is deposed in a position so as to create the at least one region wherein air is forced to u-turn, and when all of said air that is forced to u-turn encounters air that has just encountered said one or more vanes, all of said air that is forced to u-turn immediately u-turns again to pass into an inner diameter of said inner cylinder and wherein a diameter of the inner cylinder is less than a diameter of the base of the conical device.

16. A method of extinguishing embers and/or sparks by passing said embers and/or sparks through a spark arrestor, the spark arrestor comprising a) a conical device, b) one or more vanes, and c) at least one region wherein air that enters the spark arrestor is forced to u-turn, the method comprising at least passing said embers and/or sparks through the one or more vanes wherein said one or more vanes are positioned on a curved surface of the conical device said embers and/or sparks encountering said at least one region wherein air containing said embers and/or sparks is forced to u-turn, and after said air u-turns said air encounters air that has just encountered said one or more vanes, causing said air that has u-turned to immediately u-turn again to pass into an inner diameter of an inner cylinder positioned in said spark arrestor.

17. The method of claim 16, wherein the conical device has a vertex, a base, and the curved surface, wherein the vertex is positioned in a direction so that the vertex encounters air entering through an inlet port prior to the curved surface, and the curved surface encounters the air entering through the inlet port prior to the base, wherein the one or more vanes are designed to direct air passing through the one or more vanes to the at least one region wherein air is forced to u-turn.

18. The method of claim 17, further comprising an inner cylinder that is deposed in a position so as to create the at least one region wherein air is forced to u-turn.

19. The method of claim 18, wherein a diameter of the inner cylinder is less than a diameter of the base of the conical device.

20. The method of claim 19, wherein the diameter of the base of the conical device is between about 1.2 to 1.5 times larger than the diameter of the inner cylinder.

\* \* \* \* \*